E. L. DELANY.
FLOAT VALVE.
APPLICATION FILED APR. 8, 1914.

1,203,186.

Patented Oct. 31, 1916.

Witnesses:
Marion J. Balfour
M. M. Sankey

E. L. Delany, Inventor
By his Attorney

UNITED STATES PATENT OFFICE.

EDWARD L. DELANY, OF NEW YORK, N. Y.

FLOAT-VALVE.

1,203,186.  Specification of Letters Patent.  Patented Oct. 31, 1916.

Application filed April 8, 1914. Serial No. 830,422.

*To all whom it may concern:*

Be it known that I, EDWARD L. DELANY, residing at and whose post-office address is 828 Kent avenue, in the city of New York, in the county of Kings and State of New York, have invented certain new and useful Improvements in Float-Valves; and I do hereby declare the following to be a full, clear, and exact description of the invention, such as will enable others skilled in the art to which it appertains to make and use the same.

My present invention contemplates improving the valve mechanism of flush tanks equipped with float valves.

One of the objects of the invention is to provide an improved washer and another object is to provide improved means for securing the washer to the valve parts.

Figure 1:
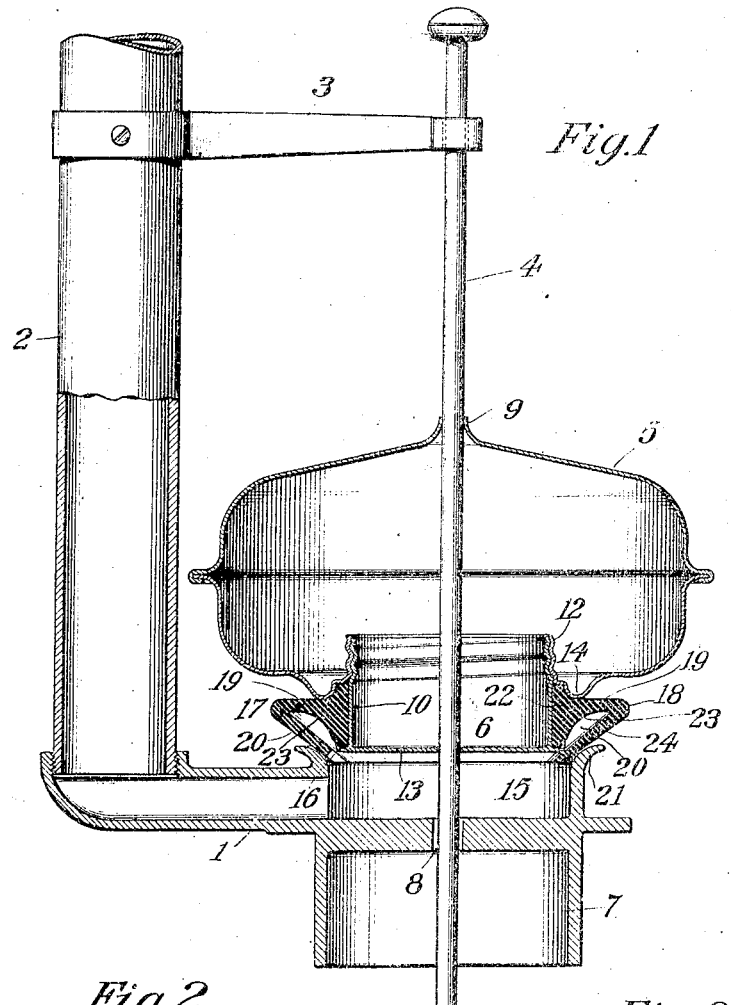
Figure 2:
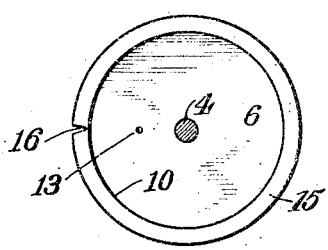
Figure 3:
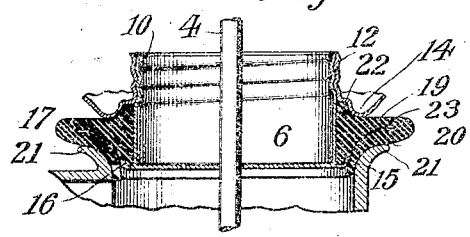

In the accompanying drawing Figure 1 is a vertical sectional view showing a valve mechanism embodying my invention. Fig. 2 is a detail. Fig. 3 is a fragmentary section showing the position of the washer when the valve is seated.

Referring to the drawing 1 designates a casing adapted for flush tanks and provided with an overflow tube 2. On this tube I have shown mounted a lateral arm 3 slotted at its outer end to form a guide for the operating rod 4 by which the valve is unseated. This rod is shown extending downward through the float 5 and valve 6 into the spud 7 where it passes through a guide 8. The float 5 is secured to rod 1 as at 9 and carries valve 6 in its vertical movement.

The valve elements comprises a float and a cylinder 10. The float is shown formed with an interiorly threaded tubular portion 12 to receive the valve body or threaded cylinder 10, both the tubular part 12 and the cylinder being open at their upper ends. The cylinder is closed at its lower end except for a vent 13. Surrounding the tubular portion 12 the float is shown formed with a downward projecting bead 14. At its lower or closed end the cylinder is formed with a flange 15 curved outward and upward and formed with a slot 16 at any point thereof as shown in Fig. 2.

The washer 17 is of peculiar formation. It is preferably a rubber ring bent back upon itself as at 18 to form the horizontal part 19 and the depending part 20 which extends beneath the flange 15 and contacts with the latter and valve seat 21. At the inner end of the horizontal part 19 the washer is formed with a shoulder 22 the upper end of which is held between the bead 14 on the float and the wall of cylinder 10, while the lower end of said shoulder is rabbeted to enter, and conform to, the flange 15.

In Letters Patent No. 1,077,457 issued to me November 4, 1913, I have shown and described a washer having for its features a shoulder securely held between two valve parts and formed with laterally and downwardly projecting tapering extremities whose combined formation corresponds to that of the valve seat. The construction referred to is efficient in that it provides effective means for holding the washer at a part thereof not touched by the water, while of the two tapering extremities only one is always immersed while the other is immersed only when the valve is open.

The present invention, while maintaining this idea, provides a stronger washer at the bend 18 and is characterized by a spring action which materially aids its efficiency. Furthermore there is an increased area of the washer in contact with the valve seat relatively to that of the patent referred to. It will be noted that in the form of embodiment illustrated the under face of the horizontal part 19 of the washer is curved as at 23 and that this curvature corresponds to that of the flaring valve seat 21 and also coincides with the curvature of flange 15. Hence when the valve is seated these curved portions tend to rest evenly on the seat, as shown in Fig. 3. In doing so, however, they have to bend the part 20 of the washer into corresponding formation and overcome its spring action which tends to maintain it in the disposition shown in Fig. 1 where the valve is open.

As the valve unseats and the part 20 expands under its tension it draws water through port 16 into the channel 24 which latter is created by the expansion. When the valve drops forcibly to its seat under the suction in the spud 7 the water contained in the channel or cavity 24 acts temporarily as a cushion and passes out through slot 16, thus saving the washer from undue wear by reason of the forcible impact.

I claim as my invention:—

1. In a valve mechanism, a valve seat, and a washer having a body portion and a depending portion intermediate said body portion and said seat, said depending portion being relatively straight and out of contact with said body portion to provide an intermediate channel when the valve is open, and adapted to be pressed into contact with said body portion when the valve is seated.

2. In a valve, a washer of flexible material bent back upon itself as at 18 to provide a substantially horizontal body portion and a depending portion, in combination with a valve seat, said depending portion of said washer extending between said body portion and said valve seat.

3. In a valve, the combination with a flaring valve seat, of a valve body having a flange, a washer seated within said flange and having a lateral portion, said lateral portion of said washer and said flange being curved to correspond to said valve seat, and said washer being bent to form a depending portion extending between said curved portion and said flange and said valve seat.

4. In a float valve, a float, a valve body and a seat, means for removably securing said float to said valve body, a washer having an inner shoulder held rigidly by said float and said valve body and having a lateral portion adapted to project beyond the valve seat and being bent at its extremity as at 18 to form a downward projecting portion adapted to extend into said valve seat.

In testimony whereof, I have signed this specification in the presence of two subscribing witnesses.

EDWARD L. DELANY.

Witnesses:
MARION I. BALFOUR,
GRAFTON L. McGILL.